(12) United States Patent  
Nayyar et al.

(10) Patent No.: US 9,000,980 B2
(45) Date of Patent: Apr. 7, 2015

(54) GNSS RECEIVER CORRELATING DOPPLER DEROTATION SAMPLES WITH CODE PHASES

(75) Inventors: Jasbir Singh Nayyar, Punjab (IN); Jawaharlal Tangudu, Bangalore (IN); Karthik Ramasubramanian, Bangalore (IN)

(73) Assignee: Texas Instruments Incorporated, Dallas, TX (US)

(*) Notice: Subject to any disclaimer, the term of this patent is extended or adjusted under 35 U.S.C. 154(b) by 325 days.

(21) Appl. No.: 13/182,233

(22) Filed: Jul. 13, 2011

(65) Prior Publication Data

US 2013/0016010 A1    Jan. 17, 2013

(51) Int. Cl.
*G01S 19/37*    (2010.01)
*G01S 19/30*    (2010.01)

(52) U.S. Cl.
CPC ..................... *G01S 19/30* (2013.01)

(58) Field of Classification Search
USPC ........................................ 342/357.77, 357.78
See application file for complete search history.

(56) References Cited

U.S. PATENT DOCUMENTS

| 2005/0151684 A1* | 7/2005 | Hsu | 342/357.12 |
| 2007/0080856 A1* | 4/2007 | Camp, Jr. | 342/357.12 |
| 2011/0007783 A1* | 1/2011 | Weill | 375/150 |

* cited by examiner

*Primary Examiner* — Harry Liu
(74) *Attorney, Agent, or Firm* — Lawrence J. Bassuk; Frank D. Cimino (57) ABSTRACT

A GNSS receiver includes at least one buffer and at least one correlator block. The at least one buffer stores a plurality of samples corresponding to a received signal. The at least one correlator block includes a Doppler derotation block configured to perform Doppler derotation corresponding to at least one Doppler frequency on the plurality of samples, a register array configured to be loaded with the plurality of samples on Doppler derotation corresponding to a Doppler frequency of the at least one Doppler frequency, and a correlator engine configured to generate correlation results by correlating the plurality of samples in the register array with a plurality of code phases for at least one GNSS satellite. A presence of at least one GNSS satellite signal may be detected based on coherent accumulation and a non-coherent accumulation of the correlation results.

12 Claims, 7 Drawing Sheets

GNSS RECEIVER CORRELATING DOPPLER DEROTATION SAMPLES WITH CODE PHASES

TECHNICAL FIELD

Embodiments of the disclosure relates to detecting satellite signals using global navigation satellite system (GNSS) receivers.

BACKGROUND

Global navigation satellite systems (GNSS) are broadly defined to include GPS (U.S.), Galileo (proposed), GLONASS (Russia), Beidou (China), IRNSS (India, proposed), QZSS (Japan, proposed) and other current and future positioning technologies using signals from satellites, with or without augmentation from terrestrial sources. Information from GNSS is being increasingly used for computing a user's positional information (e.g., a location, a speed, a direction of travel, etc.).

In GNSS, multiple satellites may be present, with each transmitting a GNSS signal. A received signal at a GNSS receiver contains one or more of the transmitted GNSS signals. To obtain the information from the respective transmitted signals, the GNSS receiver performs a signal acquisition/tracking procedure. More specifically, the GNSS receiver searches for the corresponding transmitted signals in the received signal and then locks onto them for subsequent tracking of the corresponding satellites to receive the satellite information.

The signal acquisition/tracking procedure often entails correlating the received signal (typically down-converted to baseband) with a corresponding local signal generated within the GNSS receiver. Since time required by the GNSS receiver to determine the positional information is dependent on time consumed in performing the signal acquisition/tracking procedure, sizable area and power consumption in the GNSS receiver is dedicated to the signal acquisition/tracking components in the GNSS receiver.

SUMMARY

GNSS receivers for detecting a GNSS satellite signal in a received signal are provided. In certain embodiments, a GNSS receiver includes at least one buffer and at least one correlator block. Each buffer is configured to store samples corresponding to the received signal. In some embodiments, a sampling rate for generating the samples may be a 1 sample per chip (spc), 2 spc or 4 spc.

Each correlator block includes a Doppler derotation block, a register array, and a correlator engine. The Doppler derotation block is configured to receive samples from the buffer and perform Doppler derotation corresponding to Doppler frequencies on the samples. The register array is configured to be loaded with the samples on Doppler derotation corresponding to a Doppler frequency. In some embodiments, the samples are cyclically loaded into the register array subsequent to Doppler derotation corresponding to the Doppler frequency. The register array is further configured to be reloaded with samples upon each Doppler derotation corresponding to a subsequent Doppler frequency of the at least one Doppler frequency. The correlator engine is configured to generate correlation results by correlating the samples in the register array with a plurality of code phases for GNSS satellites. In some embodiments, the plurality of code phases is configured by cyclically shifting a GNSS satellite code corresponding to each GNSS satellite by at least one code phase.

In some embodiments, each correlator block includes a correlator processing block. The correlator processing block performs at least one of a coherent accumulation and a non-coherent accumulation of the correlation results. In some embodiments, the correlator processing block also performs a timing offset correction on the correlation results prior to performing the at least one of the coherent accumulation and the non-coherent accumulation of the correlation results.

In some embodiments, the GNSS receiver further includes a memory. The memory is configured to store the coherent accumulation and/or the non-coherent accumulation of the correlation results. In some embodiments, the correlator processing block is also configured to detect a presence of a GNSS satellite signal based on the coherent accumulation and/or the non-coherent accumulation of the correlation results.

Also in such embodiments, the each correlator block includes an input quantization block and a bit accumulating block. The input quantization block performs a multiple level quantization of the samples. The multiple level quantization associates each sample with a sample bit representation. The bit accumulating block accumulates a bit at a first position within each sample bit representation prior to loading the samples in the register array.

In some embodiments, the bit at the first position within the each sample bit representation is configured to remain unaltered on correlating with code phases for the GNSS satellites. In some embodiments, the first position within each sample bit representation is a least significant bit position. In other embodiments, the correlator engine is configured to generate correlation results for the samples loaded in the register array by generating partial correlation results. This may be accomplished by correlating remaining bits within each sample bit representation with the code phases for a GNSS satellite and adding bits accumulated by the bit accumulating block to the partial correlation results.

Methods for detecting a GNSS satellite signal in a received signal are also provided. In certain embodiments, a method includes storing a plurality of samples corresponding to a signal, performing Doppler derotation corresponding to at least one Doppler frequency on the plurality of samples, and generating correlation results by correlating the Doppler derotated samples corresponding to each Doppler frequency with a plurality of code phases for GNSS satellites. In some embodiments, the method further includes performing at least one of a coherent accumulation and a non-coherent accumulation of the correlation results and detecting a presence of at least one GNSS satellite signal based on the at least one of the coherent accumulation and the non-coherent accumulation of the correlation results.

In certain embodiments, the method also includes performing a multiple level quantization of the samples for associating each sample with a sample bit representation. The method may further include accumulating a bit at a first position within each sample bit representation prior to generating correlation results. In some embodiments, the correlation results are generated by generating partial correlation results, which may include correlating remaining bits within each sample bit representation with the plurality of code phases for the GNSS satellites and adding accumulated bits to the partial correlation results.

DETAILED DESCRIPTION

It is generally desirable that signal acquisition/tracking components in GNSS receiver be designed with reduced area and power requirements, at least for reasons such as lower implementation cost and area, lower power consumption, etc. Accordingly, the present disclosure provides apparatuses, systems and methods for detecting satellite signals that overcome these and other limitations, in addition to providing currently unavailable benefits.

The following description and accompanying figures demonstrate that the present disclosure may be practiced or otherwise implemented in a variety of different embodiments. It should be appreciated, however, that the scope of the present disclosure is not limited to any or all of the specifically disclosed embodiments. Indeed, those skilled in the art will appreciate that one or more of the devices, features, operations, processes, characteristics, or other qualities of a specifically disclosed embodiment may be removed, replaced, added to, or changed without exceeding the scope of the present disclosure.

Figure 1:
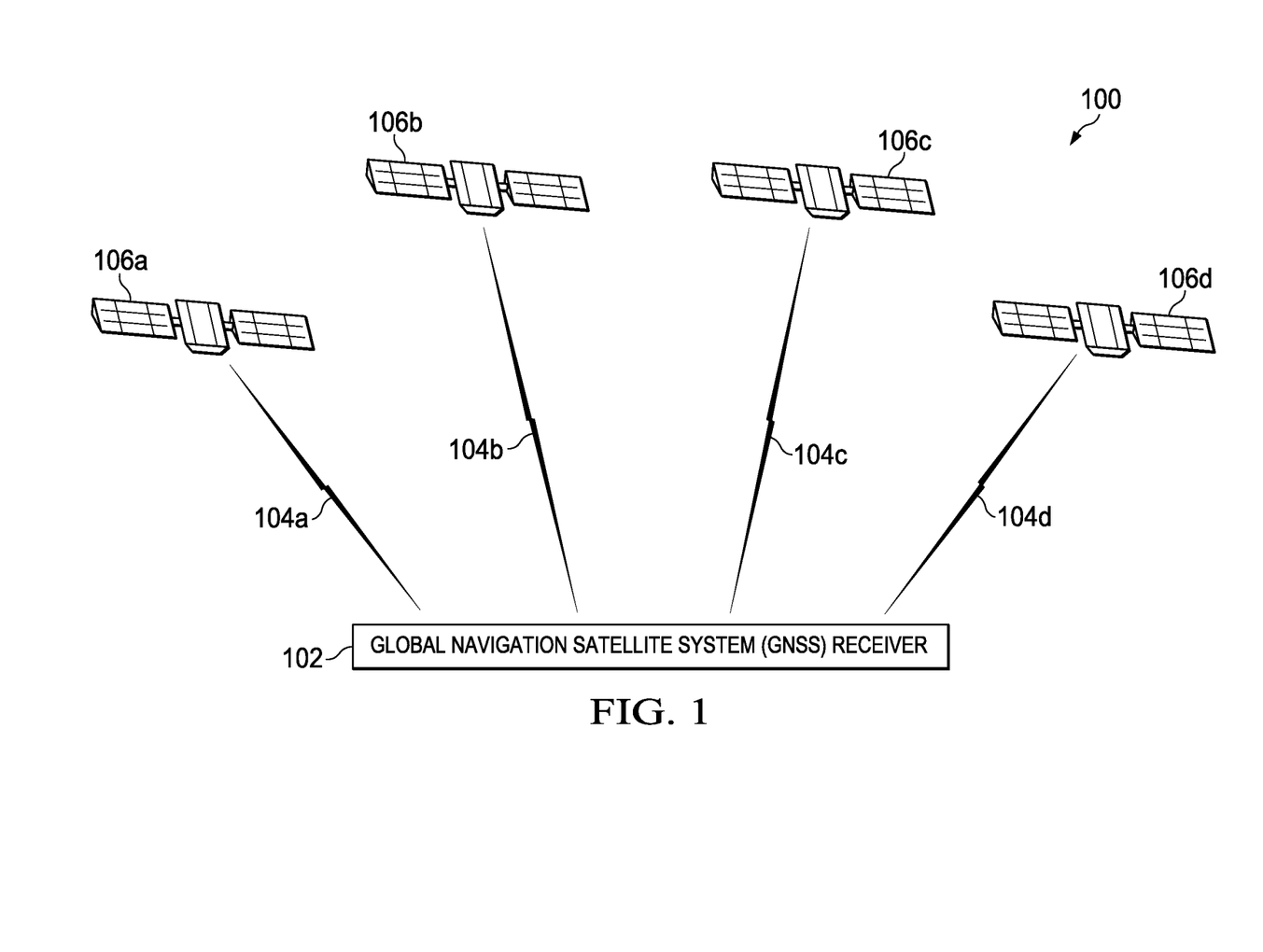
FIG. 1 is a network diagram depicting global navigation satellite system (GNSS) satellites and a GNSS receiver.

FIG. 1 is a network diagram 100 depicting global navigation satellite system (GNSS) satellites and a GNSS receiver. The network diagram 100 depicts a GNSS receiver 102 that is configured to receive satellite signals from a plurality of GNSS satellites. For instance, the GNSS receiver 102 may receive a satellite signal 104a from a GNSS satellite 106a, a satellite signal 104b from a GNSS satellite 106b, a satellite signal 104c from a GNSS satellite 106c and a satellite signal 104d from a GNSS satellite 106d. The plurality of GNSS satellites may hereinafter be collectively referred to as 'GNSS satellites' and the satellite signals, such as satellite signal 104a, 104b, 104c and 104d, may be hereinafter collectively referred to as GNSS satellite signals. The GNSS satellites may be man-made earth orbiting devices used for receiving and/or transmitting signals, which may include global positioning satellite signals, through transponders of the man-made earth orbiting device. Though FIG. 1 depicts the GNSS receiver 102 receiving the GNSS satellite signals from only four GNSS satellites, the GNSS receiver 102 may receive GNSS satellite signals from multiple satellites belonging to multiple satellite systems, such as a global positioning system (GPS), a Global'naya Navigatsionnaya Sputnikovaya Sistema (GLONASS) satellite system, a Galileo satellite system and the like, and which are commonly referred to as GNSS.

A received signal at the GNSS receiver 102 may contain multiple transmitted GNSS satellite signals. To obtain the information from the respective transmitted GNSS satellite signals, the GNSS receiver 102 may perform a signal acquisition/tracking procedure. More specifically, the GNSS receiver 102 may search for the corresponding transmitted GNSS satellite signal in the received signal. The search may be performed based on a Pseudorandom Number (PN) code that is unique to each GNSS satellite. For example, in GPS, each GNSS satellite may repeatedly transmit a unique, 1023 bit PN code of duration 1 millisecond (ms). The GNSS satellites may also transmit a data bit every 20 ms by modulating (multiplying by +1/−1) the 20 consecutive PN codes. The GNSS receiver 102 may generate local signals (at baseband) and modulate each local signal with the unique code corresponding to the each GNSS satellite to produce replica local signals. The received signal may then be correlated, i.e. matched, with the replica local signals to detect a presence of corresponding GNSS satellite signals in the received signal. On detecting a presence of a particular GNSS satellite signal (e.g., GNSS satellite signal 104a), the GNSS receiver 102 may lock onto the GNSS satellite signal for subsequent tracking of the corresponding GNSS satellite (e.g., GNSS satellite 106a) to receive satellite information. After locking onto or acquiring a minimum of four GNSS satellites, the GNSS receiver 102 may compute a user position by triangulation. The computation of the user position may include one or more operations known to those skilled in the relevant art and is not discussed herein for the sake of brevity of the description.

Figure 2:
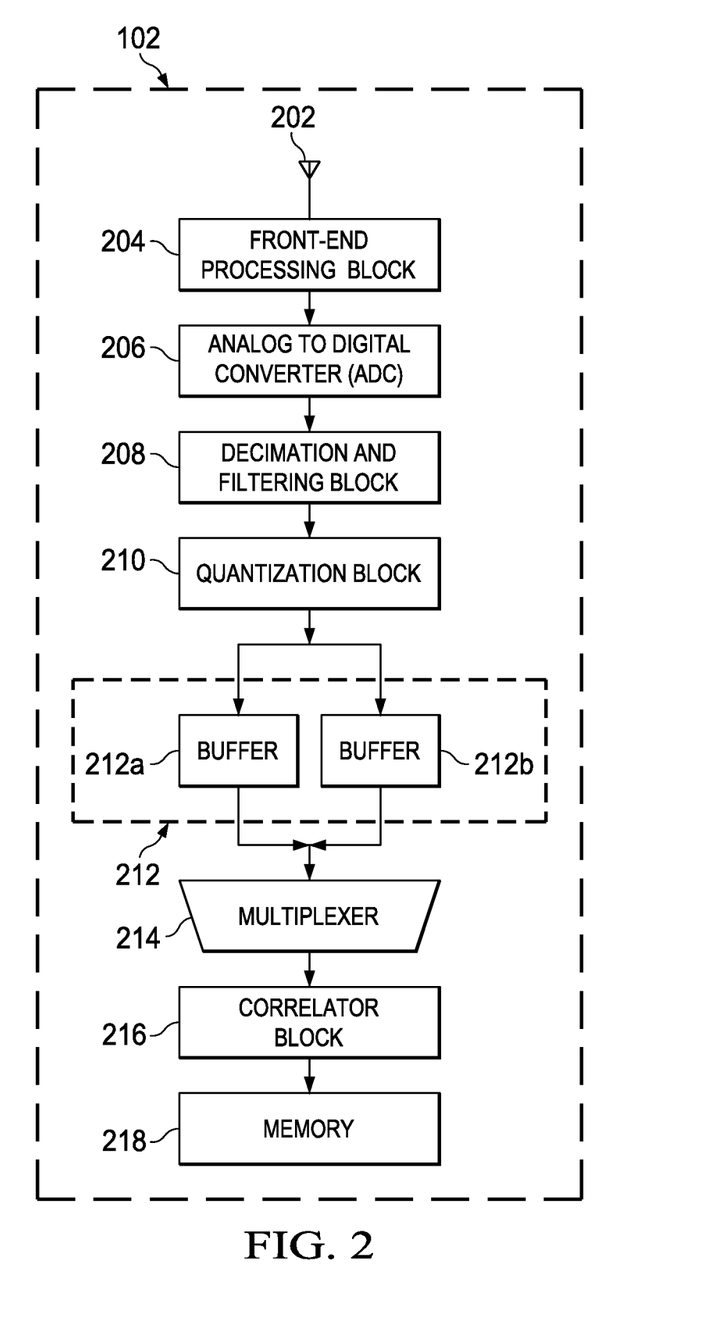
FIG. 2 is a block diagram of a GNSS receiver, according to an embodiment.

FIG. 2 is a block diagram of a GNSS receiver 102, according to an embodiment. As depicted, the GNSS receiver 102 includes an antenna 202, a front-end processing block 204, an analog-to-digital converter (ADC) 206, a decimation and filtering block 208, a quantization block 210, at least one buffer 212, such as buffers 212a and 212b, a multiplexer 214, at least one correlator block, such as correlator block 216, and at least one memory, such as memory 218. The details of the diagram are provided merely by way of illustration, and other embodiments may contain fewer or more components and corresponding interconnections.

The antenna 202 is configured to receive multiple satellite signals from GNSS satellites (not shown) in one or more satellite systems, such as GPS, GLONASS, Galileo and the like. The combination of all satellite signals is herein referred to as "received signal" or "signal." The antenna 202 is further configured to provide the signal to the front-end processing block 204. The front-end processing block 204 is configured to perform one or more levels of down-conversion to lower a carrier frequency of the signal to a lower frequency (e.g., an intermediate frequency (IF)). Additionally, the front-end processing block 204 may be configured to perform various front-end analog signal processing operations on the signal, such as band-pass filtering, amplification using a low-noise amplifier, etc. The front-end processing block 204 is also configured to provide the processed signal (e.g., IF signal) to the ADC 206. In certain embodiments, the front-end processing block 204 is designed to operate in GPS, Galileo, or similar environments using code division multiple access (CDMA) processes. The front-end processing block 204 may also be designed to operate in other environments, such as a GLONASS environment, using frequency division multiplexed (FDM) processes.

The ADC 206 is configured to sample the signal to generate a plurality of corresponding digital codes/samples. The sampling rate may be selected to be sufficiently high such that code and data information in the IF signal is preserved. The ADC 206 is configured to provide the plurality of samples corresponding to the signal to the decimation and filtering block 208. The decimation and filtering block 208 is configured to down-convert the IF frequency to baseband and provide the final down-converted signal at baseband to the quantization block 210. The quantization block 210 is configured to perform a multiple level quantization of the plurality of samples. The multiple level of quantization of the plurality of samples may associate each sample with the sample bit representation. For example, the quantization block 210 may be configured to perform a seven level quantization of the samples. The seven level of quantization of the samples may associate each sample with a three bit representation.

The quantization block 210 is configured to provide the samples to the buffers 212a and 212b. The buffers 212a and 212b will hereinafter be collectively referred to as "at least one buffer 212." The at least one buffer 212 is depicted to include only two buffers 212a and 212b merely by way of illustration, and the at least one buffer 212 may contain fewer or more buffers and corresponding interconnections. The at least one buffer 212 is configured to store the plurality of samples corresponding to the signal (down-converted to baseband). The plurality of samples may be stored at a frequency of "S" samples per chip (spc), for example, 1 spc, 2 spc and/or 4 spc.

The at least one buffer 212 is configured to provide the plurality of samples to the correlator block 216 via the multiplexer 214. The multiplexer 214 is configured to select the samples from the buffers of the at least one buffer 212 and provide the samples to the correlator block 216. The correlator block 216 is configured to generate correlation results by generating replica local signals corresponding to each transmitted GNSS satellite signal (signals at baseband modulated by unique PN code corresponding to the each GNSS satellite), and correlating the signal with each replica local signal to acquire (or lock onto) and track (to maintain lock) the transmitted GNSS satellite signals. The memory 218 is configured to store the correlation results. A detection of a presence of at least one GNSS satellite signal in the received signal may be performed based on the correlation results. The detection of the presence of the at least one GNSS satellite signal in the received signal is explained in detail in FIG. 3.

Figure 3:
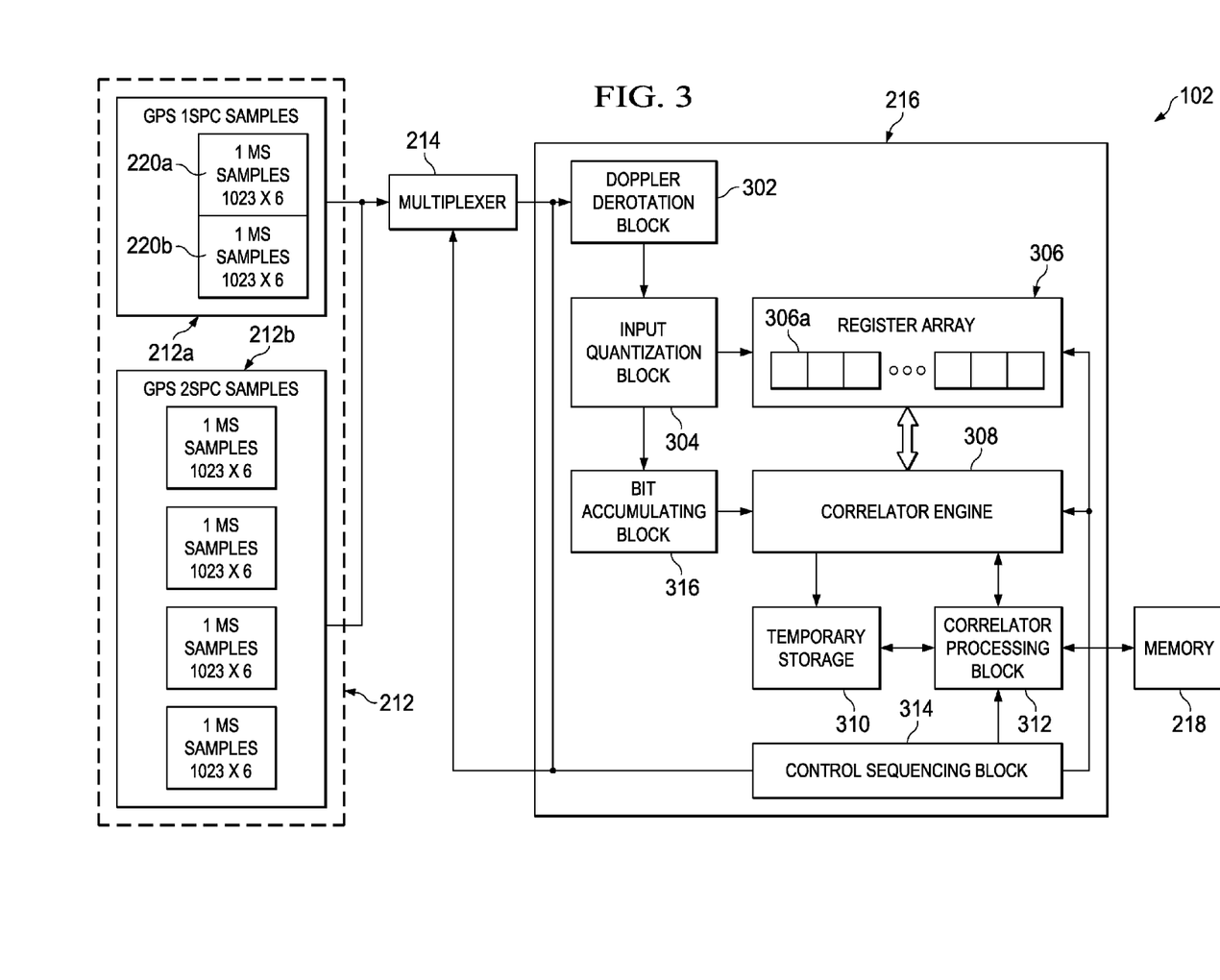
FIG. 3 is a block diagram of a portion of a GNSS receiver for detecting the presence of GNSS satellite signals in a received signal, according to an embodiment.

FIG. 3 is a block diagram of a portion of a GNSS receiver 102 for detecting the presence of at least one GNSS satellite signal in a received signal, according to an embodiment. More particularly, FIG. 3 depicts the at least one buffer 212 (i.e., buffers 212a and 212b), the multiplexer 214, the correlator block 216 and the memory 218. The correlator block 216 includes a Doppler derotation block 302, an input quantization block 304, a register array 306, a correlator engine 308, a temporary storage 310, a correlator processing block 312, a control sequencing block 314, and a bit accumulating block 316. The details of the correlator block 216 are provided merely by way of illustration, and other embodiments may contain fewer or more components and corresponding interconnections.

As explained in FIG. 2, the at least one buffer 212 may be configured to store a plurality of samples corresponding to the signal. An example of the at least one buffer 212 may be a ping-pong buffer. Accordingly, each buffer of the at least one buffer 212 may be configured to store samples in one section (for example, the ping section 220a) of the each buffer while the samples in another section (for example, the pong section 220b) of the each buffer are being selected by the multiplexer 214 to be forwarded to the correlator block 216 for processing. Thereafter, the stored samples from the ping section 220a may be forwarded for processing to the correlator block 216 while samples from the quantization block 210 are loaded into the pang section 220b. Another example of at least one buffer 212 may be a cyclical buffer.

In an example embodiment, each buffer 212a and 212b of the at least one buffer 212 is configured to store a number of samples spanning at least one code period. In an example embodiment, when the GNSS satellite signal is from any of a GPS satellite or a GLONASS satellite, the code period may correspond to 1 ms time period. The 1 ms time period in GPS may correspond to a unique, 1023 bit code that is specific to each GPS satellite (not shown). The buffer 212a is depicted as capable of storing GPS samples at 1 spc. At 1 spc, 1023 samples may be generated corresponding to the code period of 1 ms. Also, each sample may be embodied by 3 bit I and Q values for a total of 6 bits. Accordingly, one code period of samples may include 1023×6 bits. The buffer 212a is depicted as capable of storing two such 1 spc samples.

Similarly, the buffer 212b is depicted as capable of storing GPS samples at 2 spc. At 2 spc, 2046 samples may be generated corresponding to the code period of 1 ms and code length of 1023 bits. The 2046 samples may be split into 1023 odd samples and 1023 even samples. Each sample may be depicted by 3 bit I and Q values for a total of 6 bits. Accordingly, one code period of odd samples may include 1023×6 bits and one code of even samples may include 1023×6 bits. The buffer 212b is depicted as being capable of storing four such 1 ms samples.

It should be appreciated that GPS 1 spc samples and GPS 2 spc samples do not limit the scope of the present disclosure. It should also be appreciated that the at least one buffer 212 may not be restricted to GPS samples but may also include samples corresponding to GNSS satellites belonging to other satellite systems, such as GLONASS (e.g., using 511 bit PN-code). In an example embodiment, the at least one buffer 212 may include a buffer for each frequency of carrier signal at which a GLONASS satellite transmission is performed. Further, it should be appreciated that the 1 spc and 2 spc rates are depicted for illustration purposes only and do not limit the scope of the present disclosure. Also, each buffer 212a and 212b of the at least one buffer 212 may include samples that are sampled at smaller or larger number of samples per chip. For example, each buffer 212a and 212b of the at least one buffer 212 may store samples that are sampled at 4 spc, 6 spc and so on. Moreover, the number of 1 ms worth samples stored in each buffer 212a and 212b of the at least one buffer 210 may also vary and may not be restricted to the number depicted in FIG. 3.

In an example embodiment, the multiplexer 214 may be a 2:1 multiplexer in FIG. 3. However, the multiplexer 214 is not restricted to a 2:1 multiplexer. Indeed, various possible configurations of the multiplexer 214 may be implemented. The multiplexer 214 may select the samples from the at least one buffer 212 and provide the samples to the correlator block 216. In an example embodiment, the multiplexer 214 may be directed to select one of 1 spc samples and 2 spc samples by the control sequencing block 314 based on a mode of the GNSS receiver 102. For example, when the GNSS receiver 102 is in a cold start mode and has to perform a search for detecting the presence of the GNSS satellite signal from start then the multiplexer 214 may be directed to select 1 spc samples. On a coarse detection of the presence of the GNSS satellite signal, the multiplexer 214 may be directed to select 2 spc samples for better peak identification and better resolution sensitivity.

The selected samples (for example, one code period of samples, i.e. 1023 samples) from the plurality of samples stored in the at least one buffer 212 may be provided to the Doppler derotation block 302 by the multiplexer 214. The Doppler derotation block 302 is configured to perform Doppler derotation corresponding to at least one Doppler frequency on the samples. Due to relative motion of the GNSS satellites and the user, there may be a Doppler shift in the frequency "f" of the received signal. Several such estimates of the Doppler frequency (i.e., Doppler shift in the frequency) may be considered. In an example embodiment, the Doppler derotation block 302 may be configured with a carrier phase generator utilizing a phase accumulator (not shown) to generate negative Doppler coefficients or negative Doppler frequency corresponding to each Doppler frequency. The samples may be multiplied by the negative Doppler frequency to perform the Doppler derotation and remove the impact of the carrier Doppler shift in the signal.

The Doppler derotated samples may be received by the input quantization block 304. The input quantization block 304 may perform a multiple level quantization of the Doppler derotated samples. The multiple level of quantization of the samples may associate each sample with the sample bit representation. For example, the input quantization block 304 may be configured to perform a seven level quantization of the samples. The seven level of quantization of the samples may associate each sample with a three bit representation. In an example embodiment, the multiple level of quantization may be performed in a manner wherein a bit at a first position within the each sample bit representation is configured to remain unaltered on correlation with a plurality of code phases for the at least GNSS satellite. The multiple level of quantization of the samples is explained in further detail in conjunction with FIG. 4.

It may be appreciated that the input quantization block 304 may perform quantization of the samples in a manner similar to the quantization block 210. The samples may need to be quantized again post Doppler derotation for maintaining the sample bit representation of the samples intact for correlation purposes. Subsequent to the quantization, the Doppler derotated samples corresponding to a Doppler frequency of the at least one Doppler frequency are loaded in the register array 306. An example of the register array 306 is a tapped delay line. In an example embodiment, the register array 306 includes locations, such as location 306a for storing a sample (i.e., sample bit representations corresponding to the sample) of the Doppler rotated samples.

The register array 306 is configured to be reloaded with samples upon each Doppler derotation corresponding to a subsequent Doppler frequency of the at least one Doppler frequency. For example, after generating the correlation results for the Doppler derotated samples corresponding to the first Doppler frequency of the at least one frequency in the register array 306, the samples in the register array 306 may be replaced with Doppler derotated samples corresponding to the second Doppler frequency of the at least one Doppler frequency. The samples in the register array 306 may be similarly replaced subsequent to generation of the correlation results with the Doppler derotated samples corresponding to the next Doppler frequency.

For the samples in the register array 306, the correlator engine 308 is configured to generate correlation results by correlating the samples with a plurality of code phases for at least one GNSS satellite. More specifically, the correlator engine 308 may be configured to generate local signals corresponding to each transmitted GNSS signal and correlate the received signal with each of the local signals to acquire (lock onto) and track (to maintain lock) the transmitted GNSS signals. Each local signal may be a corresponding PN code, generated for example by using a PN code generator (not shown), of a GNSS satellite. On correlating the samples stored in the register array 306, the local signal may be shifted by one bit (i.e. code phase) till all bits of the local signal are shifted and the correlation with the samples stored in the register array 306 may be performed for each shifted version of the local signal.

In an example embodiment, the register array 306 is configured to be loaded with samples spanning one code period. In an example embodiment, 1023 samples (i.e. three bit representations of 1023 samples) are loaded into the register array 306 after correcting for a Doppler frequency, for example first Doppler frequency. During the process of loading the samples in the register array 306, the correlator engine 308 may also generate a local signal which is a PN code corresponding to a GNSS satellite, for example a first GNSS satellite. The correlator engine 308 may correlate the samples with the local signal, i.e. multiply the samples with +1/−1 values corresponding to the PN code, to generate a set of correlation results.

In cyclic convolution based correlation, the PN code may be shifted by one code phase (for example, one bit) and the correlation is performed again with the samples (kept static in the register array 306) to generate another set of correlation results. The PN code may be cyclically shifted by 1023 bits and correlation performed with the samples for each code phase to generate 1023 correlation results. The correlation results may be stored in the temporary storage 310. Similarly, the correlation results may be generated for multiple Doppler frequencies for a plurality of code phases for each GNSS satellite being searched and stored in the temporary storage 310. It will be apparent that the plurality of code phases is configured by cyclically shifting a GNSS satellite code corresponding to each GNSS satellite of the at least one GNSS satellite by at least one code phase. It should be appreciated that for samples at 2 spc, after computing all the correlations of odd samples, the 1023 input samples corresponding to the even samples may be loaded and correlations may be computed and stored in a temporary storage 310.

In a linear convolution based correlation, the PN code may be shifted by one code phase and correlation performed for the cyclically loaded samples in the register array 306 to generate the correlation results. The samples are cyclically loaded into the register array 306 subsequent to Doppler derotation corresponding to the Doppler frequency. In an example embodiment, 1023 samples (for example, sample 1 to sample 1023) corresponding to a first Doppler frequency may be loaded in the register array 306 and the correlation of the 1023 samples may be performed with the plurality of code phases of the at least one GNSS satellite to generate the correlation results. Subsequent to the generation of the correlation results, the next Doppler derotated sample (for example, sample 1024) corresponding to the first Doppler frequency may be cyclically loaded into the register array 304 while the oldest sample (i.e. sample 1) may exit the register array 306. The register array 306 may be similarly cyclically loaded by replacing the oldest sample by the newest sample and the correlation results generated after each loading operation. The PN code may be cyclically shifted by 1023 bits and correlation performed with the cyclically loaded samples for each code phase to generate the correlation results. The correlation results may be stored in the temporary storage 310. Similarly, the correlation results may be generated for multiple Doppler frequencies for a plurality of code phases for each GNSS satellite being searched and stored in the temporary storage 310.

As explained in conjunction with FIG. 2, the at least one buffer 212 is depicted to include only two buffers 212a and 212b merely by way of illustration, and the at least one buffer 212 may contain fewer or more buffers and corresponding interconnections. It may be appreciated that for linear convolution based correlation, the at least one buffer 212 may include three buffers (not shown in FIG. 3) for storing samples instead of two buffers 212a and 212b as depicted in FIG. 3. On loading the first two buffers, for example, first buffer and second buffer, respectively, with the samples, a third buffer (not shown in FIG. 3) may be selected for loading purposes. During loading of the third buffer, the samples from the first buffer may be selected by the multiplexer 214 to be forwarded to the correlator block 216 for processing. Subsequently, the samples in the second buffer and the third buffer may be selected, respectively, by the multiplexer 214 to be forwarded to the correlator block 216 for processing.

In an example embodiment, for a 2 spc sampling rate, correlation results for the even samples (0,2,4,6, . . . ) are stored in the temporary storage 310 followed by the storage of the correlation results for the odd samples (1,3,5 . . . ). The correlation results may then be arranged in a natural order (0,1,2,3 . . . ) and provided to the correlator processing block 312. The correlator processing block 312 is configured to perform at least one of a coherent accumulation and a non-coherent accumulation of the correlation results. The memory 218 is configured to store the at least one of the coherent accumulation and the non-coherent accumulation of the correlation results. The above sequence of steps may be repeated for plurality of code phases for different GNSS satellites.

The correlator processing block 312 is further configured to perform a timing offset correction on the correlation results prior to performing the at least one of the coherent accumulation and the non-coherent accumulation of the correlation results. Procedures for the timing offset correction, such as code Doppler correction, may include those known to persons skilled in the relevant arts and are not included herein for sake of brevity of description.

The memory 218 is configured to store the at least one of the coherent accumulation and the non-coherent accumulation of the correlation results. It should be appreciated that the memory 218 may include a bank of coherent memories and a bank of non-coherent memories for the coherent accumulation and the non-coherent accumulation, respectively, of the correlation results. The coherent accumulation and non-coherent accumulation of the correlation results may be performed to improve a signal-to-noise ratio (SNR) of the received signal for detecting the presence of the GNSS satellite signals in the received signal. The coherent accumulation of the correlation results may include summing the correlation results corresponding to a code phase across multiple sample sets. The coherent accumulation may also include integrating I and Q components of the received signal separately. The non-coherent accumulation may include known techniques, such as accumulating absolute values of accumulated data from the coherent accumulation, accumulating squares of absolute vales of accumulated data from the coherent accumulation and the like.

In an example embodiment, the correlator processing block 312 is further configured to detect the presence of the at least one GNSS satellite signal based on the at least one of the coherent accumulation and the non-coherent accumulation of the correlation results. For example, the correlation results corresponding to each code phase search in 1 ms may be summed over 1 s (or such other programmed time duration) to identify a clear peak (for example by checking for crossing of pre-defined mathematical threshold functions and the like), which may signify the presence of GNSS satellite signal. The location of the peak may then be obtained by interpolation, and such known procedures, for obtaining a distance between a GNSS satellite and the user.

The control sequencing block 314 is configured to trigger/control a sequence of operations, for example, by triggering the multiplexer 214 to select samples from the at least one buffer 212, selecting the Doppler frequency for performing Doppler derotation, i.e., carrier Doppler removal, loading the samples into the register array 306, selecting the GNSS satellite code for performing the correlation operation and performing of the coherent and non-coherent accumulation. The control sequencing block 314 is configured to repeat the above operations for multiple combinations of Doppler frequencies and GNSS satellite codes.

In FIG. 3, the GNSS receiver 102 is depicted to include a bit accumulating block 316. More particularly, the correlator block 216 is depicted to include the bit accumulating block 316 in between the input quantization block 304 and the correlator engine 308. However, the bit accumulating block 316 may be disposed at any location in the correlator block 216 for accumulating the bit at the first position within the each sample representation prior to loading the samples in the register array 306. It may be appreciated that each sample loaded in the register array 306 is represented by its entire sample bit representation (including the bit at the first position) and that the bit accumulating block 316 may be configured to record the bit at the first position for the each sample. In an example embodiment, the first position corresponds to a least significant bit (LSB) position within the each sample bit representation and the bit accumulating block 316 stores and accumulates the LSB bits of the sample bit representations prior to loading the samples in the register array 306. The correlator engine 308 is configured to perform partial correlation of the samples by correlating remaining bits, i.e., bits not at the LSB position or the most significant bits, with the plurality of code phases of the at least one GNSS satellite. The accumulated LSB bits may be added to the partial correlation results for generating the correlation results. The addition of the bit at the first position, for example, the LSB position, within the each sample bit representation to the partial correlation results in explained in FIG. 5.

Figure 4:
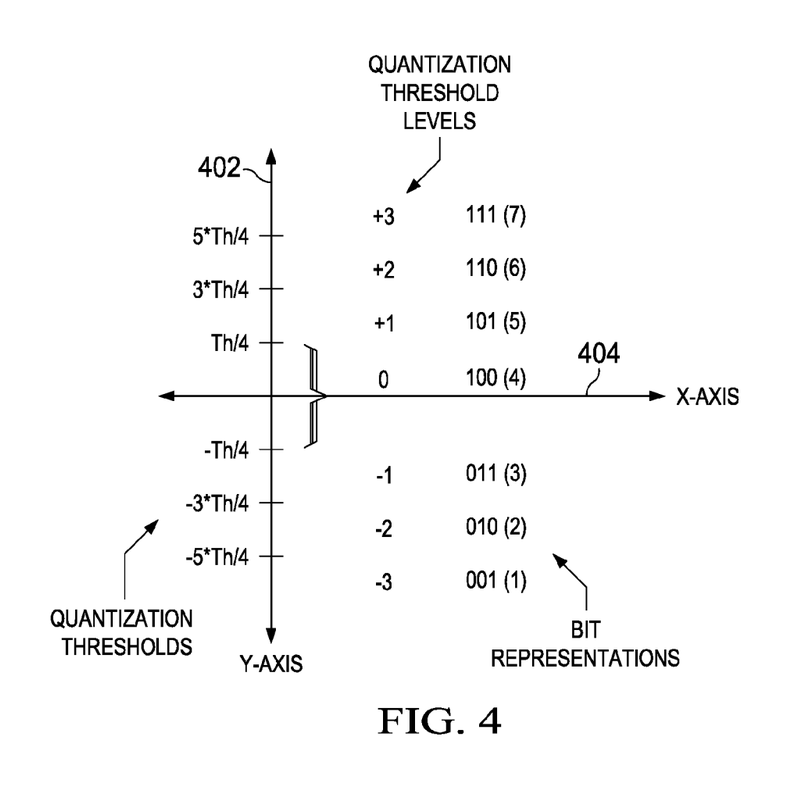
FIG. 4 is a schematic diagram of multiple level quantization of samples, according to an embodiment.

FIG. 4 is a schematic diagram of multiple level quantization of samples, according to an embodiment. As explained, the GNSS receiver 102 includes the input quantization block 304. The input quantization block 304 is configured to perform a multiple level quantization on the samples. The quantization is performed on the generated samples (post sampling) for representing the samples with a discrete number of representations. In FIG. 4, the Y axis 402 depicts the quantization thresholds (5*Th/4, 3*Th/4, Th/4, −Th/4, −3*Th/4, −5*Th/4) with corresponding seven quantization levels (−3, −2, −1, 0, 1, 2, 3). Each quantization level is associated with a sample bit representation. For example, the quantization level "−3" is associated with sample bit representation 001 (corresponding to 1) and the quantization level "+3" is associated with sample bit representation 111 (corresponding to 7). The X axis 404 may include the discrete samples to be quantized (not depicted in FIG. 3).

The quantization thresholds, the quantization levels and the bit representations are depicted for illustration purposes only and may be not considered to be limiting the scope of the description. Also, other quantization thresholds with corresponding quantization levels and bit representations may be implemented.

Performing quantization of the samples in such a manner may provide several advantages. More particularly, when the sample is multiplied by +1/−1 (corresponding to the PN code) during correlation, the LSB bit does not change. For example, when "−3" quantization level with corresponding sample bit representation 001 is multiplied by "−1" corresponding to the PN code, the correlation result is "+3" which has a sample bit representation of 111. The LSB bit "1" remains unaltered during the correlation. Similarly, when +1 quantization level with corresponding sample bit representation 101 is multiplied by −1, the result is −1 which has a sample bit representation of 011. The LSB bit "1" remains similarly unaltered during the correlation.

As the LSB bit remains unaltered during the correlation process, the LSB bits may be accumulated and stored prior to loading the samples in the register array 306. Partial correlations may then be performed with two bits of the three bit sample representation and the LSB bits may thereafter be added to the result to generate the correlation results. Such a procedure may lead to significant area/power saving. The accumulation of the bits for addition to partial correlations is explained in further detail in FIG. 5.

Figure 5:
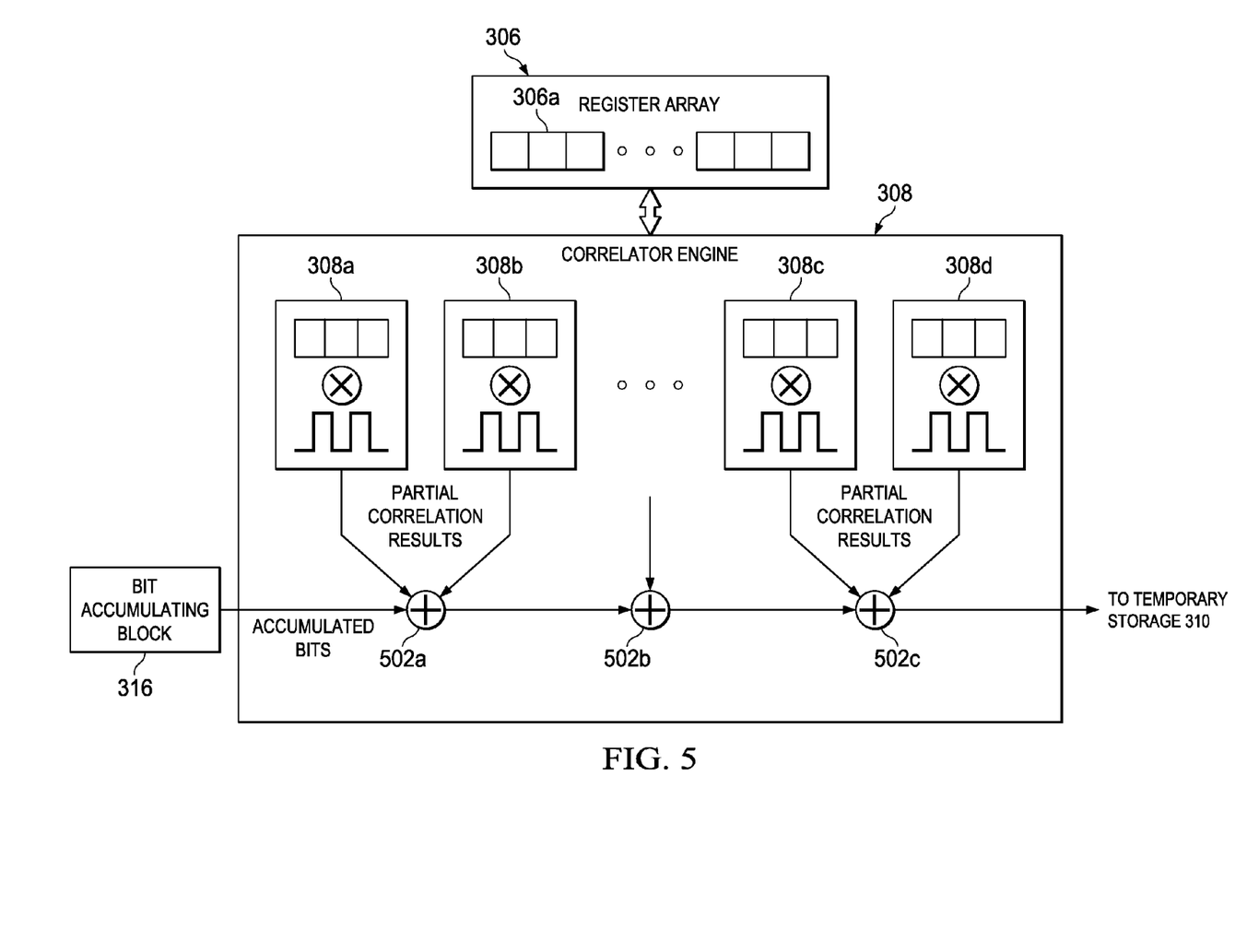
FIG. 5 is a schematic diagram depicting addition of the bit at the first position within the each sample bit representation to the partial correlation results for generating the correlations results, according to an embodiment.

FIG. 5 is a schematic diagram depicting an addition of the bit at the first position, for example the LSB position, within the each sample bit representation to the partial correlation results for generating the correlations results, according to an embodiment. More particularly, FIG. 5 depicts an implementation of the correlator engine 308. FIG. 3 depicts a single large correlator engine 308 capable of correlating samples, for example, 1023 samples, with plurality of code phases corresponding to at least one GNSS satellite code (e.g., the PN code). In an embodiment, such a correlator engine 308 may be implemented to include multiple instances of smaller correlator engines, for example correlator engines 308*a*, 308*b*, 308*c* and 308*d*, which perform correlation of a portion of samples, which may then be combined, for example by adder tree mechanism to generate the correlation results. For example, for correlating 1023 samples loaded into the register array 306, the correlator engine 308 may include 64 instances of 16 bit correlator engines (e.g., correlator engines such as the correlator engines 308*a*, 308*b*, 308*c* and 308*d*) capable of performing correlation of 16 samples of the signal with the corresponding portion of a PN code in a parallel manner.

Various components within the correlator engines for performing correlation (e.g., multiplexers for multiplying 1023 bit PN code with three bit sample representations) and performing addition of outputs (e.g., by using adder tree mechanism) are not depicted in FIG. 5 for the sake of brevity of description and as the correlation computation logic is known in the relevant arts.

As explained in FIGS. 3 and 4, each sample loaded in the register array 306 is associated with a sample bit representation, for example, a three bit representation. The bit accumulating block 316 stores and accumulates bits at the first position, for example, the LSB position, within each sample bit representation prior to loading the samples into the register array 306. The correlator engine 308 is configured to perform correlation of the remaining bits of the samples, for example, the bits excluding the bit at the first position, with the plurality of code phases of the at least one GNSS satellite to generate partial correlation results. For example, only two bits (i.e., bits not in the LSB bit position) of sample bit representation of each sample may be multiplied with the PN code and the resulting two bit correlation result may be added (e.g., using adders such as adder 502*a*, 502*b* and 502*c*) to the sum of LSB bits from the bit accumulating block 316 to generate the correlation results. In FIG. 5, the sum of the LSB bits (depicted as accumulated bits) from the bit accumulating block 316 is depicted to be added to the 2-bit correlation results from each correlator engines, such as the correlator engines 308*a*, 308*b*, 308*c* and 308*d*, to generate the correlation results.

The multiple level of quantization explained in FIG. 4 enables sample bit representations of the samples to include a bit (for example, the LSB bit) which remains unaltered during correlation process and as such may be stored and accumulated before-hand and later added to the partial correlation results, thereby precluding computation of the bit for each sample bit representation during the correlation process leading to sizable area and power saving for the GNSS receiver 102.

It should be noted that some of the features described in this specification have been presented as blocks (e.g., the correlator block), in order to more particularly emphasize their implementation independence. A block may be implemented as a hardware circuit comprising custom very large scale integration (VLSI) circuits or gate arrays, off-the-shelf semiconductors such as logic chips, transistors, or other discrete components. A block may also be implemented in programmable hardware devices, such as field programmable gate arrays, programmable array logic, programmable logic devices, graphics processing units, and the like.

A block may also be at least partially implemented in software for execution by various types of correlator processing blocks. An identified block of executable code may, for instance, comprise one or more physical or logical blocks of computer instructions which may, for instance, be organized as an object, procedure, or function. Nevertheless, the executables of an identified block need not be physically located together, but may comprise disparate instructions stored in different locations which, when joined logically together, comprise the module and achieve the stated purpose for the module. Further, blocks may be stored on a computer-readable medium, which may be, for instance, a hard disk drive, flash device, random access memory (RAM), tape, or any other such medium used to store data. Moreover, components, such as buffers of the at least one buffer 212, memory 218, and temporary storage 310 may be implemented as storage components, for example, random access memory (RAM), flash memory, etc.

The flowchart diagrams that follow are generally set forth as logical flowchart diagrams. The depicted operations and sequences thereof are indicative of at least one embodiment of the present disclosure. It should be appreciated, however, that the scope of the present disclosure includes methods that use other operations and sequences, and methods that are useful or similar in function, logic, or effect. Also, while various arrow types, line types, and formatting styles may be employed in the flowchart diagrams, they are understood not to limit the scope of the corresponding method(s). In addition, some arrows, connectors and other formatting features may be used to indicate the logical flow of the methods. For instance, some arrows or connectors may indicate a waiting or monitoring period of an unspecified duration. Accordingly, the specifically disclosed operations, sequences, and formats are provided to explain the logical flow of the methods and are understood not to limit the scope of the present disclosure.

Figure 6:
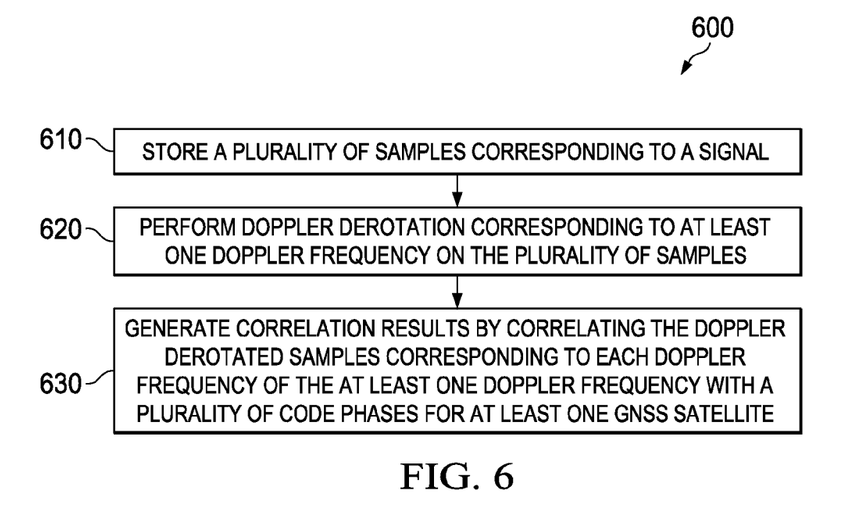
FIG. 6 is a flowchart diagram of a method for detecting satellite signals in a received signal, according to an embodiment.

FIG. 6 is a flowchart diagram of a method 600 for detecting presence of satellite signals in a received signal, according to an embodiment. The method 600 includes storing 610 a plurality of samples corresponding to a signal (e.g., using the at least one buffer 212), performing 620 Doppler derotation corresponding to at least one Doppler frequency on the plurality of samples (e.g., using the Doppler derotation block 302) and generating 630 correlation results by correlating the Doppler de-rotated samples corresponding to each Doppler frequency of the at least one frequency with a plurality of code phases for at least one GNSS satellite (e.g., using the correlator engine 308). In an example embodiment, the method also includes performing at least one of a coherent accumulation and a non-coherent accumulation of the correlation results and detecting a presence of at least one GNSS satellite signal based on the at least one of the coherent accumulation and the non-coherent accumulation of the correlation results (e.g., using the correlator processing block 312).

As explained in FIG. 1, the signal may contain multiple transmitted GNSS signals, such as the satellite signals 104a, 104b, 104c and 104d. The received signal may be down-converted to an intermediate frequency (e.g., using the front-end processing block 204), converted to the plurality of digital samples (e.g., using the ADC 206) and down-converted to baseband frequency (e.g., using the decimation and filtering block 208) prior to storing the plurality of samples.

In another example embodiment, a multiple level quantization of samples may be performed (e.g., using the input quantization block 304) prior to generating the correlation results. The multiple level of quantization of samples may associate each sample with a sample bit representation. In an example embodiment, a bit at a first position within each sample bit representation of the plurality of sample bit representations may be accumulated (e.g., using the bit accumulating block 316) prior to generating correlation results. In an example embodiment, the correlation results may be generated by generating partial correlation results by correlating remaining bits within each sample bit representation with a plurality of code phases for at least one GNSS satellite and adding the bits accumulated to the partial correlation results (as explained in FIG. 5).

Figure 7A:
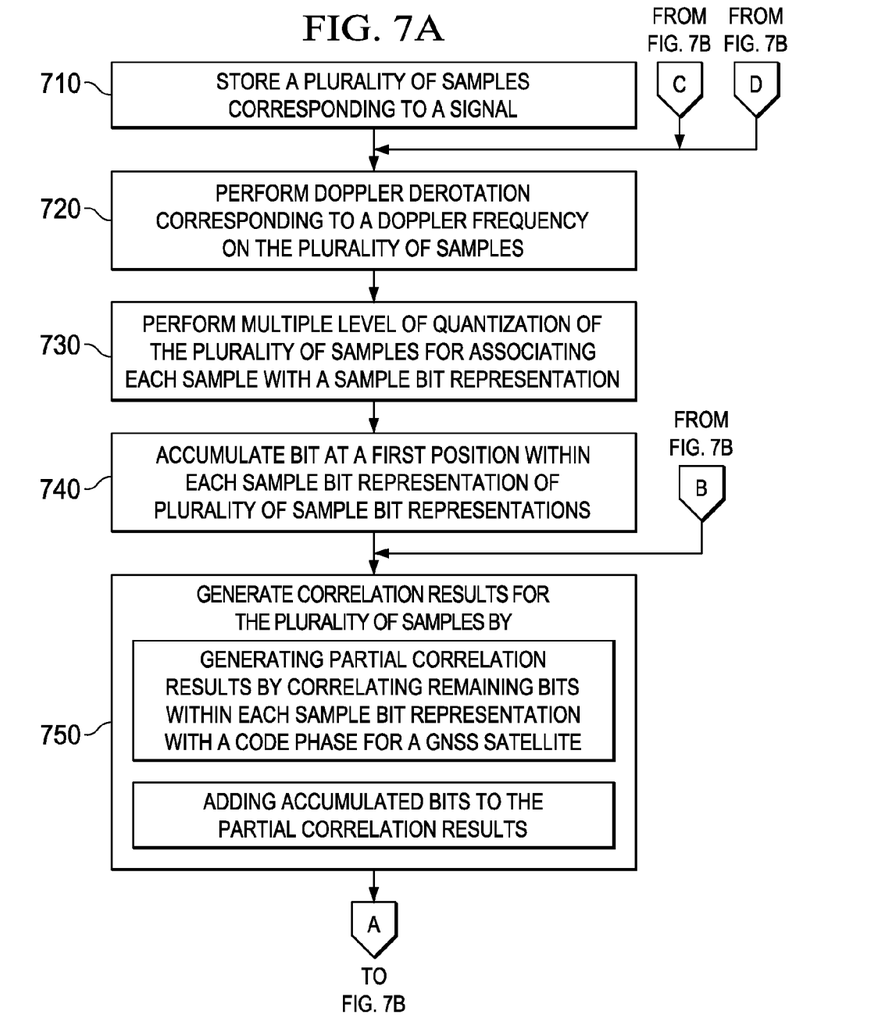
FIGS. 7A and 7B depict a flowchart diagram of another method for detecting satellite signals in a received signal, according to an embodiment.
Figure 7B:
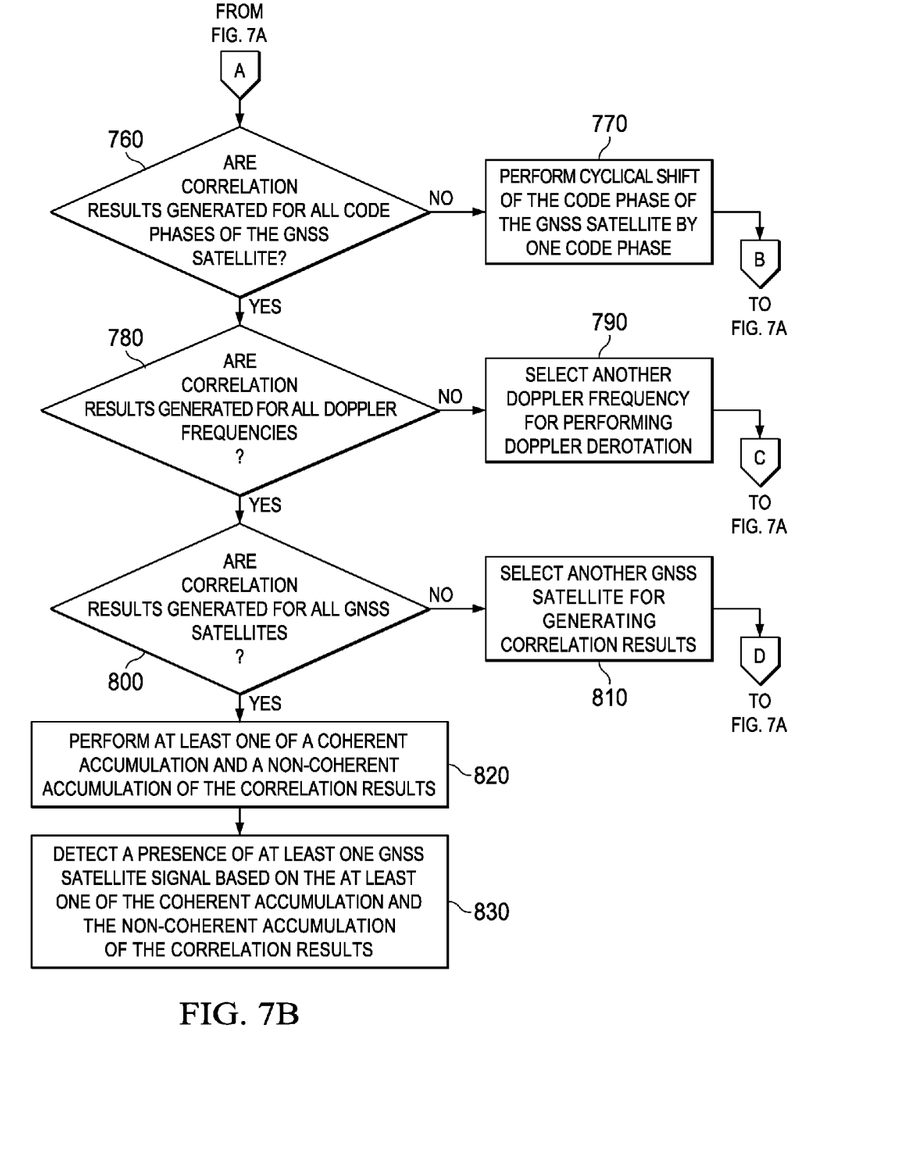

FIGS. 7A and 7B depict a flowchart diagram of another method 700 for detecting presence of satellite signals in a received signal. The method 700 includes storing 710 a plurality of samples corresponding to a signal (e.g., using the at least one buffer 212), performing 720 Doppler derotation corresponding to a Doppler frequency on the plurality of samples (e.g., using the Doppler derotation block 302), performing 730 multiple level of quantization of the plurality of samples for associating each sample with a sample bit representation (e.g., using the input quantization block 304), accumulating 740 bit at a first position within each sample bit representation of the plurality of sample bit representations (e.g., using the bit accumulating block 316), and generating 750 correlation results for the samples by generating partial correlation results by correlating remaining bits within each sample bit representation with a plurality of code phases for a GNSS satellite and adding accumulated bits to the partial correlation results (e.g., using the correlator engine 308).

The method 700 further includes determining 760 whether correlation results are generated for all code phases of the GNSS satellite. If it is determined that the correlation results are not generated for all code phases of the GNSS satellite, then the method 700 includes performing 770 cyclical shifting of the code phase of the GNSS satellite by one code phase and generating 760 correlation results for the samples. It is again determined 760 whether correlation results are generated for all code phases of the GNSS satellite. The method 700 includes repeating determining 760, performing 770 and generating 750 till correlation results are generated for all code phases of the GNSS satellite.

On determining that the correlation results are generated for all code phases of the GNSS satellite, then the method includes determining 780, whether correlation results are generated for all Doppler frequencies. If it is determined that the correlation results are not generated for all Doppler frequencies, then the method 700 includes selecting 790 another Doppler frequency (i.e. different Doppler frequency than the Doppler frequency for which correlation results are generated) and repeating performing 720 to determining 780 till correlation results are generated for all code phases and all Doppler frequencies of the GNSS satellite.

The method further 700 includes determining 800 whether correlation results are generated for all GNSS satellites. For example, determining 800 may be performed for all satellites in the GPS constellation or the GLONASS constellation or both. If it is determined that the correlation results are not generated for all the GNSS satellites, then the method 700 includes selecting 810 another GNSS satellite (i.e. different GNSS satellite than the GNSS satellite for which correlation results are generated) and generating 760 correlation results for the samples for all the code phases of the another GNSS satellite. The method 700 includes repeating performing 720 to determining 800 till correlation results are generated for all combinations of Doppler frequencies, code phases and GNSS satellites.

The generation of the correlation results for all combinations of Doppler frequencies, code phases and GNSS satellites in the method 700 is depicted for illustration purposes only and may be not considered to be limiting the scope of the description. It will be evident to those skilled in the relevant arts, that though the method 700 depicts generating correlation results for all combinations of Doppler frequencies, code phases and GNSS satellites, the generation of the correlation results may be limited to selected code-phases of select GNSS satellites for reducing memory and computational capacity requirement.

The method 700 further includes performing 820 at least one of a coherent accumulation and a non-coherent accumulation of the correlation results and detecting 830 a presence of at least one GNSS satellite signal based on the at least one of the coherent accumulation and the non-coherent accumulation of the correlation results (e.g., using the correlator processing block 312).

In an example embodiment, the multiple quantization of the samples may be performed in a manner that the bit at the first position within the each sample bit representation remains unaltered on correlation with a plurality of code phases for the at least one GNSS satellite code (as explained in FIG. 4). In an example embodiment, the first position within the each sample bit representation may be a least significant bit position.

As described above, the systems, devices (i.e., apparatuses) and methods of the present disclosure include multiple solutions for detecting presence of the satellite signals in a received signal by a GNSS receiver, such as the GNSS receiver 102. It should be appreciated, therefore, that the present disclosure discloses several features that enable the GNSS receiver to be implemented with smaller area and power requirements. For example, storing the samples in the register array post Doppler derotation of the samples and performing correlation of the samples by cyclic shifting of the PN-code using a single large time multiplexed correlator engine, enables the GNSS receiver to efficiently perform correlation operation precluding traditional architecture of dedicated logical channels corresponding to one Doppler frequency/GNSS satellite combination, thereby providing considerable area/power saving (~50%). Moreover, performing quantization of the samples as explained in FIG. 4, wherein the LSB does not change during correlation operation provides a significant computational complexity reduction leading to significant area/power saving. Furthermore, the features of the GNSS receiver may be applied to one or more satellite systems (including combination of satellite systems) such as GPS, GLONASS and the like, with little modification.

It should be noted that reference throughout this specification to features, advantages, or similar language does not imply that all of the features and advantages should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Further, the described features, advantages, and characteristics of the disclosure may be combined in any suitable manner in one or more embodiments. One skilled in the relevant art will recognize that the disclosure can be practiced without one or more of the specific features or advantages of a particular embodiment. In other instances, additional features and advantages may be recognized in certain embodiments that may not be present in all embodiments of the disclosure.

One having ordinary skill in the art will understand that the present disclosure, as discussed above, may be practiced with steps and/or operations in a different order, and/or with hardware elements in configurations which are different than those which are disclosed. Therefore, although the disclosure has been described based upon these preferred embodiments, it should be appreciated that certain modifications, variations, and alternative constructions are apparent and well within the spirit and scope of the disclosure. In order to determine the metes and bounds of the disclosure, therefore, reference should be made to the appended claims.

What is claimed is:

1. A global navigation satellite system (GNSS) receiver, the GNSS receiver comprising:
   at least one buffer configured to store a plurality of samples corresponding to a signal; and
   at least one correlator block, the at least one correlator block comprising:
      a Doppler derotation block configured to receive the plurality of samples from the at least one buffer and perform Doppler derotation corresponding to at least one Doppler frequency on the plurality of samples,
      a register array configured to be loaded with the plurality of samples on Doppler derotation corresponding to a Doppler frequency of the at least one Doppler frequency,
      a correlator engine configured to generate correlation results by correlating the plurality of samples loaded in the register array with a plurality of code phases for at least one GNSS satellite,
      an input quantization block configured to perform a multiple level quantization of the plurality of samples, the multiple level of quantization of the plurality of samples associating each sample with a sample bit representation; and
      a bit accumulating block capable of accumulating bit at a first position within each sample bit representation prior to loading the plurality of samples in the register array.

2. The GNSS receiver of claim 1, wherein the correlator engine is configured to generate the correlation results for the plurality of samples in the register array by
   generating partial correlation results by correlating remaining bits within each sample bit representation with the plurality of code phases for the at least one GNSS satellite; and
   adding bits accumulated by the bit accumulating block to the partial correlation results.

3. A global navigation satellite system (GNSS) receiver, the GNSS receiver comprising:
   at least one buffer configured to store a plurality of samples corresponding to a signal, each sample of the plurality of samples associated with a sample bit representation; and
   at least one correlator block, the at least one correlator block comprising
      a Doppler derotation block configured to receive the plurality of samples from the at least one buffer and perform Doppler derotation corresponding to at least one Doppler frequency on the plurality of samples,
      a bit accumulating block capable of accumulating bit at a first position within each sample bit representation of the plurality of samples subsequent to Doppler derotation corresponding to a Doppler frequency of the at least one Doppler frequency,
      a register array configured to be loaded with the plurality of samples corresponding to the Doppler frequency,
      a correlator engine configured to generate correlation results for the plurality of samples in the register array by
         generating partial correlation results by correlating remaining bits within each sample bit representation with a plurality of code phases for at least one GNSS satellite, and
         adding bits accumulated by the bit accumulating block to the partial correlation results, and
      a correlator processing block configured to perform at least one of a coherent accumulation and a non-coherent accumulation of the correlation results; and
   at least one memory configured to store the at least one of the coherent accumulation and the non-coherent accumulation of the correlation results.

4. The GNSS receiver of claim 3, wherein the at least one correlator block further comprises:
   an input quantization block configured to perform a multiple level quantization of the plurality of samples, the multiple level of quantization of the plurality of samples associating each sample with the sample bit representation.

5. The GNSS receiver of claim 3, wherein the bit at the first position within the each sample bit representation is configured to remain unaltered on correlating with a plurality of code phases for the at least one GNSS satellite.

6. The GNSS receiver of claim 3, wherein the first position within the each sample bit representation is a least significant bit position.

7. The GNSS receiver of claim 3, wherein the correlator processing block is further configured to detect a presence of at least one GNSS satellite signal based on the at least one of the coherent accumulation and the non-coherent accumulation of the correlation results.

8. The GNSS receiver of claim 3, wherein the at least one correlator block comprises a single correlator enabled to search multiple satellites one after the other in a time division multiplexed manner.

9. The GNSS receiver of claim 3, wherein a channel/correlator is used to search multiple satellites.

10. The GNSS receiver of claim 3, wherein samples from only one combination of satellite and Doppler are searched at a time.

11. A method comprising:
   storing a plurality of samples corresponding to a signal;
   performing Doppler derotation corresponding to at least one Doppler frequency on the plurality of samples;

performing a multiple level quantization of the plurality of samples, the multiple level of quantization of the plurality of samples associating each sample with a sample bit representation;

accumulating bit at a first position within each sample bit representation of the samples prior to generating of the correlation results; and generating correlation results by correlating the Doppler derotated samples corresponding to each Doppler frequency of the at least one Doppler frequency with a plurality of code phases for at least one GNSS satellite.

12. The method of claim 11, wherein the correlation results are generated by:

generating partial correlation results by correlating remaining bits within each sample bit representation with a plurality of code phases for the at least one GNSS satellite; and adding accumulated bits to the partial correlation results.

* * * * *